United States Patent
Sakai et al.

(10) Patent No.: US 10,536,042 B2
(45) Date of Patent: Jan. 14, 2020

(54) AXIAL AIR GAP TYPE ELECTRIC MOTOR

(71) Applicant: Hitachi Industrial Equipment Systems Co., Ltd., Chiyoda-ku, Tokyo (JP)

(72) Inventors: Toru Sakai, Tokyo (JP); Daisaku Takahashi, Tokyo (JP); Jun Sakurai, Tokyo (JP); Shuuichi Takahashi, Tokyo (JP); Hirooki Tokoi, Tokyo (JP); Yukimasa Maeda, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 306 days.

(21) Appl. No.: 15/304,248

(22) PCT Filed: Dec. 22, 2014

(86) PCT No.: PCT/JP2014/083818
§ 371 (c)(1),
(2) Date: Dec. 20, 2016

(87) PCT Pub. No.: WO2015/159461
PCT Pub. Date: Oct. 22, 2015

(65) Prior Publication Data
US 2017/0093232 A1 Mar. 30, 2017

(30) Foreign Application Priority Data
Apr. 14, 2014 (JP) .................... 2014-082445

(51) Int. Cl.
*H02K 1/14* (2006.01)
*H02K 1/18* (2006.01)

(52) U.S. Cl.
CPC ............... *H02K 1/14* (2013.01); *H02K 1/182* (2013.01)

(58) Field of Classification Search
CPC ........... H02K 1/14; H02K 1/18; H02K 1/182; H02K 15/02; H02K 21/24; H02K 2203/12
See application file for complete search history.

(56) References Cited

U.S. PATENT DOCUMENTS
2004/0164641 A1   8/2004   Yamada et al.

FOREIGN PATENT DOCUMENTS
CN    101447701 A    6/2009
CN    103138421 A    6/2013
(Continued)

OTHER PUBLICATIONS

Taiwanese-language Office Action issued in counterpart Taiwanese Application No. 104103612 dated Dec. 4, 2015 with English translation (Eight (8) pages).
(Continued)

*Primary Examiner* — Jue Zhang
(74) *Attorney, Agent, or Firm* — Crowell & Moring LLP

(57) ABSTRACT

An axial air gap type electric motor includes: a stator with stator cores in a ring shape around a rotating shaft and including a laminated iron core that is a prismatic body of metal plate-like members laminated in a radial direction of the rotating shaft, a tubular bobbin with an inner diameter into which the laminated iron core is inserted, and a coil wound on the extension of the outer diameter of the laminated iron core; and a rotor plane-facing the rotating shaft direction end section of the stator with a predetermined air gap interposed therebetween. The laminated iron core includes: a core member with continuously laminated metal plate-like members, the widths of which increase in a rotational direction of the rotating shaft from the center toward a radial direction; and a core member with continuously laminated metal plate-like members, the widths of which are substantially equal.

3 Claims, 5 Drawing Sheets

(56) References Cited

FOREIGN PATENT DOCUMENTS

| | | | |
|---|---|---|---|
| CN | 103975504 A | | 8/2014 |
| JP | 2004-282989 A | | 10/2004 |
| JP | 2010-136476 A | | 6/2010 |
| JP | 2010136476 A | * | 6/2010 |
| JP | 2010-148308 A | | 7/2010 |
| JP | 2011-55646 A | | 3/2011 |
| JP | 2011055646 A | * | 3/2011 |
| JP | 2011-250651 A | | 12/2011 |
| JP | 2012-19582 A | | 1/2012 |
| JP | 2013-121226 A | | 6/2013 |
| TW | 201223081 A | | 6/2012 |
| WO | WO 2009/057674 A1 | | 5/2009 |
| WO | WO 2013/084614 A1 | | 6/2013 |

OTHER PUBLICATIONS

International Search Report (PCT/ISA/210) issued in PCT Application No. PCT/JP2014/083818 dated Mar. 31, 2015 with English translation (Four (4) pages).

Japanese-language Written Opinion (PCT/ISA/237) issued in PCT Application No. PCT/JP2014/083818 dated Mar. 31, 2015 with English translation (Four (4) pages).

Japanese-language Office Action issued in counterpart Japanese Application No. 2016-513612 dated Jan. 16, 2018 with English translation (Six (6) pages).

Japanese Office Action issued in counterpart Japanese Application No. 2016-513612 dated Jul. 18, 2017 with English translation (six pages).

Extended European Search Report issued in counterpart European Application No. 14889626.9 dated Oct. 16, 2017 (seven pages).

Chinese-language Office Action issued in counterpart Chinese Application No. 201480079571.7 dated Apr. 28, 2018 with partial English translation (eight pages).

Japanese-language Office Action issued in counterpart Japanese Application No. 2018-078100 dated Feb. 26, 2019 with English translation (six (6) pages).

European Office Action issued in counterpart European Application No. 14889626.9 dated Feb. 18, 2019 (seven (7) pages).

* cited by examiner

AXIAL AIR GAP TYPE ELECTRIC MOTOR

TECHNICAL FIELD

The present invention relates to an axial air gap type electric motor, and more particularly to an axial air gap type electric motor in which a laminated iron core is used in a stator.

BACKGROUND ART

In recent years, in order to improve the efficiency of an electric motor, a permanent magnet (PM) motor has been widely used. A neodymium magnet is a magnet having a higher efficiency than others but involves problems in terms of cost and the like because it contains a rare metal (rare earth).

As a magnet containing no rare metal, a magnet containing a ferrite magnet is generally used. However, in a radial air gap type electric motor having an air gap in the same direction as the rotating shaft, a ferrite magnet needs to be arranged along the rotation direction of the output shaft, and hence, in order to obtain the same performance as that of the neodymium magnet, it is necessary to increase the size of the electric motor to increase the volume of the ferrite magnet. That is, there is a problem in that the output and the size of an electric motor are in a trade-off relation.

As an electric motor which solves the relationship between the output and the size of the electric motor, an axial air gap type electric motor is known. The axial air gap type electric motor has a characteristic such that the thickness in the rotating shaft direction can be reduced, that is, the motor can be made to be flat, compared with the radial air gap type electric motors, such as an inner rotor type motor.

Patent Literature 1 discloses an axial air gap type electric motor in which a stator and a rotor plane-face each other via a predetermined air gap widening in the radial direction of the rotating shaft. Specifically, the axial air gap type electric motor includes: a stator formed by arranging a plurality of stator cores in a ring shape about the rotating shaft; and two rotors each facing each of the both end surfaces of the stator in the rotating shaft direction. The core member of the stator is formed by an iron core, an insulator (bobbin), and a coil. The iron core is a laminated iron core having a substantially trapezoidal-shaped cross-section formed by laminating metal plate-like members in the radial direction of the rotating shaft.

CITATION LIST

PATENT LITERATURE 1: JP-A-2004-282989

SUMMARY OF INVENTION

Technical Problem

Meanwhile, a core member, which is a plate-like magnetic body represented by an electromagnetic steel plate and an amorphous tape, has thickness variation (plate thickness deviation). Therefore, in the case where the laminated iron core used in the stator of the axial air gap type electric motor is manufactured, even when a fixed number of the core members are laminated, the laminated layer thickness may not be fixed.

In the case where the stator core to be manufactured is configured, such as by inserting the laminated iron core, as a prismatic body, into a tubular bobbin, and then, winding a coil around the outer periphery of the bobbin, there is a problem that, when the laminated layer thickness of the iron core becomes large, the laminated core member is buckled so that the iron core cannot be correctly inserted. On the other hand, there is such a problem that, when the laminated layer thickness of the iron core becomes small, the iron core drops from the bobbin. This problem can cause loss of productivity of the axial air gap type electric motor.

In this regard, the laminated iron core used in the axial air gap type electric motor has a characteristic that the width of the laminated metal plate-like member is changed from the rotating shaft in the radial direction of the rotating shaft (is changed to, for example, a substantially trapezoidal shape cross section by lamination). For this reason, when the number of laminated layers is increased or decreased correspondingly to the plate thickness deviation, the shape of the laminated iron core becomes different. Therefore, it is necessary to adjust the number of laminated layers on the basis of the cutting width obtained by calculating the plate thickness dimension and the iron core shape all the time, which are changed. Therefore, there is a problem that, when the cutting dimension and the number of laminated layers are controlled by measuring the plate thickness of the member always used, the productivity is significantly decreased.

It is desired to efficiently cope with the plate thickness deviation of the laminated iron core.

Solution to Problem

In order to solve the above-described problems, the invention described in the claims is applied. That is, the invention provides an axial gap type electric motor including: a stator formed by arranging, in a ring shape about a rotating shaft, stator cores each configured by a laminated iron core, as a prismatic body, made up of laminating metal plate-like members in the radial direction of the rotating shaft, a tubular bobbin having an inner diameter into which the laminated iron core is inserted, and a coil wound on the extension of the outer diameter of the laminated iron core; and at least one rotor plane-facing a cross section of a rotating-shaft direction end portion of the stator via a predetermined air gap. The axial gap type electric motor is characterized in that the laminated iron core is made up of: a portion formed by continuously laminating metal plate-like members whose widths in the rotation direction of the rotating shaft are increased from the rotation shaft center in the radial direction; and a portion formed by continuously laminating metal plate-like members whose widths in the rotation direction of the rotating shaft are substantially equal.

Advantages Effects of Invention

An aspect of the present invention provides an effect that the fixed laminated dimension of the laminated iron core can be easily obtained in correspondence with variation in the thickness dimension of the metal plate-like member configuring the laminated iron core. Further, the aspect of the present invention provides an effect that the outside diameter shape of the laminated iron core can be maintained and secured.

Other objects and advantages of the invention will become apparent from the following description.

DESCRIPTION OF EMBODIMENTS

In the following, embodiments of the present invention are described in detail with reference to the drawings.
[First Embodiment]

Figure 1A:
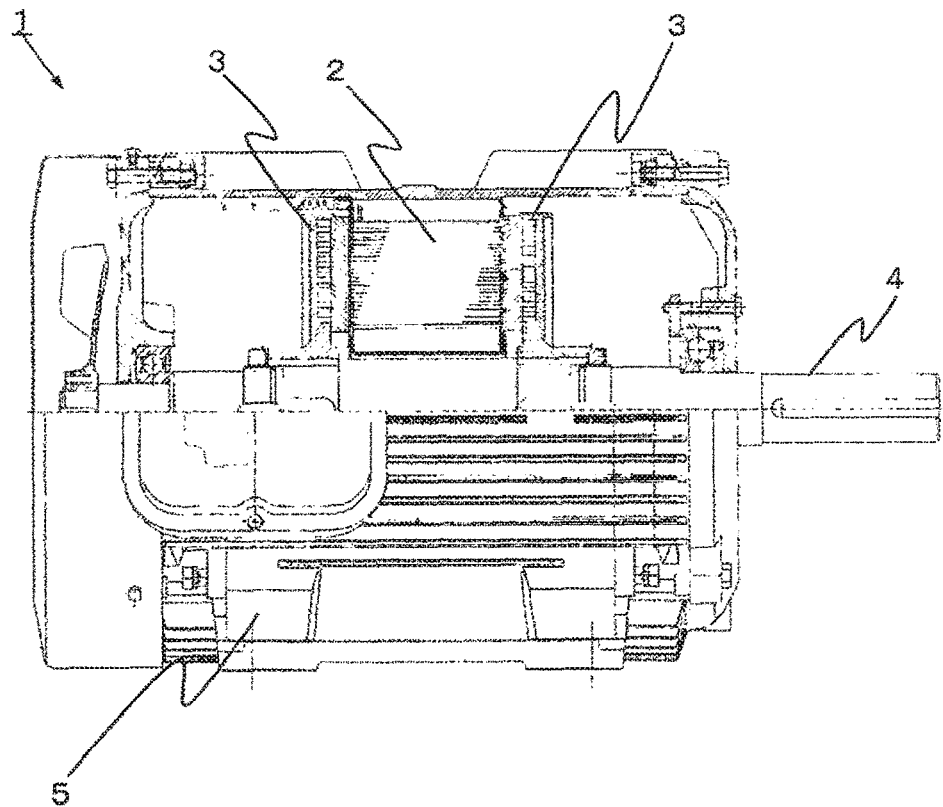
FIG. 1A is a side view schematically showing an overall configuration of an axial air gap type electric motor of a first embodiment to which the present invention is applied.
Figure 1B:
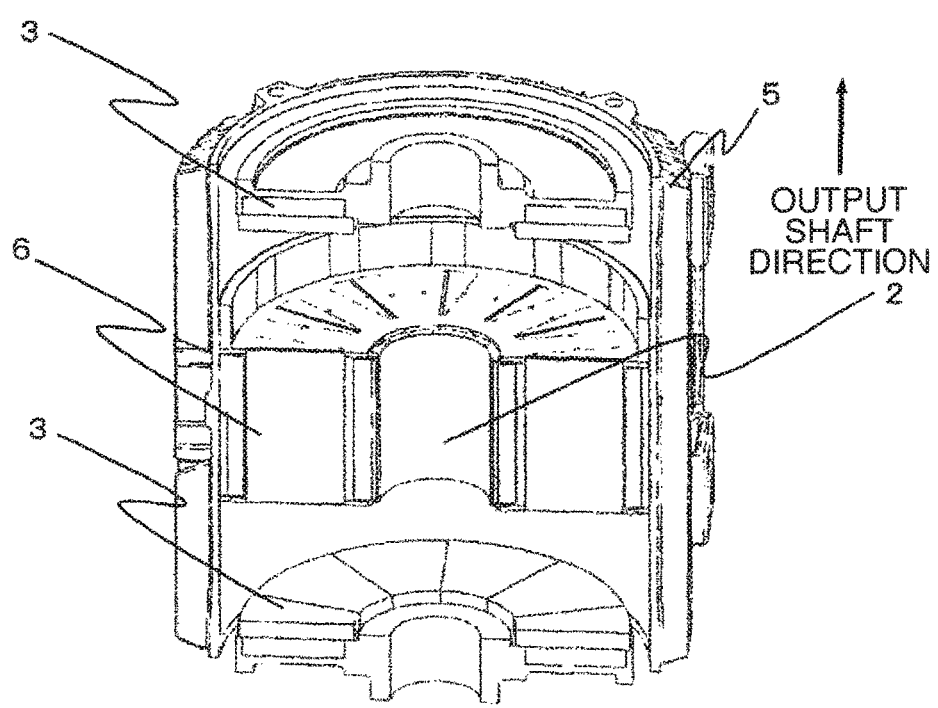
FIG. 1B is a longitudinal-section perspective view schematically showing a main portion of the axial air gap type electric motor of the first embodiment.

FIG. 1(a) shows an overall configuration of an axial air gap type electric motor 1 of a first embodiment to which the present invention is applied, and FIG. 1(b) is a cross sectional view of a main portion of the axial air gap type electric motor. The axial air gap type electric motor 1 includes, in the inside of a substantially tubular housing 5, a stator 2, a rotor 3 fixed to a rotating shaft 4 and rotated together with the rotating shaft 4, output side and opposite-to-output side end brackets each connected to the rotating shaft 4 via bearings, a cooling fan passing through the opposite-to-output side end bracket to be connected to the end portion of the rotating shaft 4 and rotated together with the rotating shaft 4, and a fan cover guiding cooling air generated by the cooling fan to the outer peripheral side of the housing 5.

As shown in FIG. 1(b), the axial air gap type electric motor 1 has a two rotor armature structure in which the ring-shaped stator 2, having magnetic flux in the rotating shaft direction, plane-faces each of the two rotors 3 respectively provided on the output shaft side and the opposite-to-output shaft side via a predetermined air gap. It should be noted that the present invention is not limited to this, and the present invention can be applied to various forms, such as, a single rotor type, and a type formed by a plurality of stators and by a plurality of rotors.

In the stator 2, a plurality of (twelve in the present embodiment) stator cores 6 are arranged in a ring shape about the rotating shaft direction, and the outer periphery of the stator cores 6 is fixed directly to the housing 5 by resin molding (not shown). It should be noted that the stator 2 may be manufactured separately as a solid reinforcement member, such as a resin molded member, and fixed to the motor housing 5 with bolts, and the like.

Figure 2A:
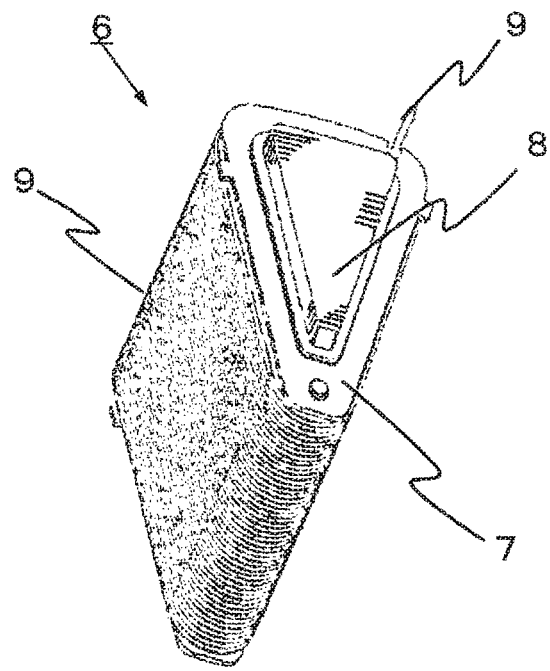
FIG. 2A is a perspective view schematically showing a stator core of the axial air gap type electric motor of the first embodiment.
Figure 2B:
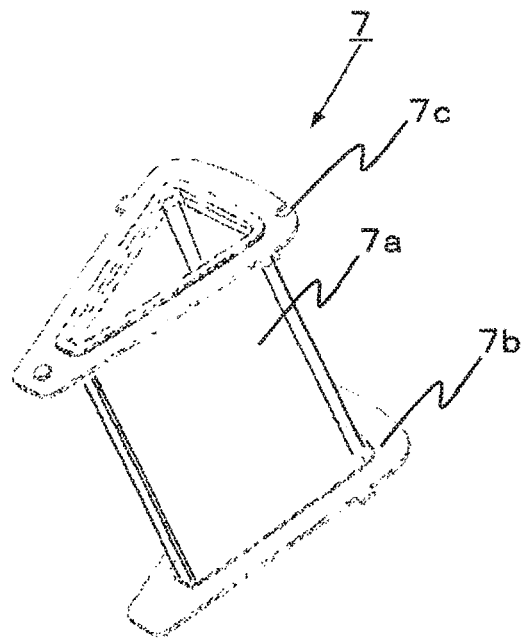
FIG. 2B is a perspective view schematically showing a bobbin configuring the stator core.

FIG. 2(a) and FIG. 2(b) show the stator core 6 and a bobbin 7 which configures the stator core 6. The stator core 6 is configured by a laminated iron core 8, the bobbin 7, and a coil 9. The bobbin 7 includes a tubular section 7a having substantially trapezoidal shaped inner and outer diameters, a flange 7b extended, by a predetermined width, from the outer periphery in the vicinity of each of the end portions of the tubular section 7a in the vertical direction, and one or more coil lead-out ports provided at portions of the flange 7b which are located on the side of the housing 5. That is, the laminated iron core 8 is inserted in the inner diameter of the tubular section 7a of the bobbin 7, and a coil is wound in a plurality of turns around the outer diameter of tubular section 7a of the bobbin 7.

The laminated iron core 8 is formed by laminating a plate-like metal magnetic body (core member) in the radial direction of the rotating shaft 4 (from the side of the rotating shaft 4 to the side of the housing 5) and has a prismatic body shape having a substantially trapezoidal cross-section. Here, a thin board (tape) containing amorphous is used as the plate-like metal magnetic body, but the plate-like metal magnetic body is not limited to this.

Figure 2C:
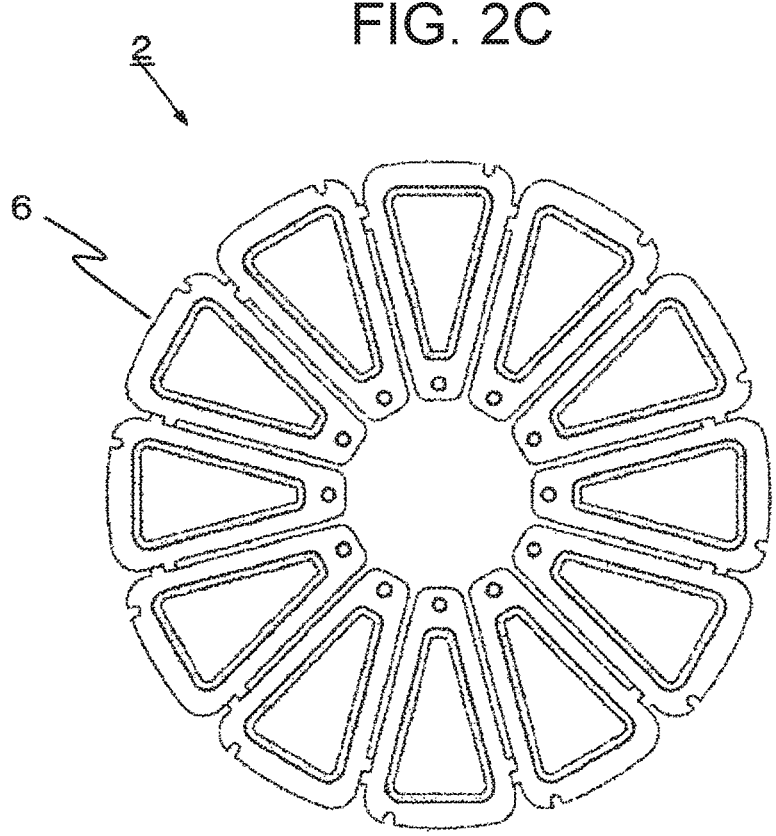
FIG. 2C is a front view schematically showing the stator configured by the stator cores.

As shown in FIG. 2(c), the stator 2 is obtained by arranging, in a ring shape, the stator cores 6 configured in this way.

Next, the laminated iron core 8 as one of the features of the present embodiment is described in detail.

Figure 3:
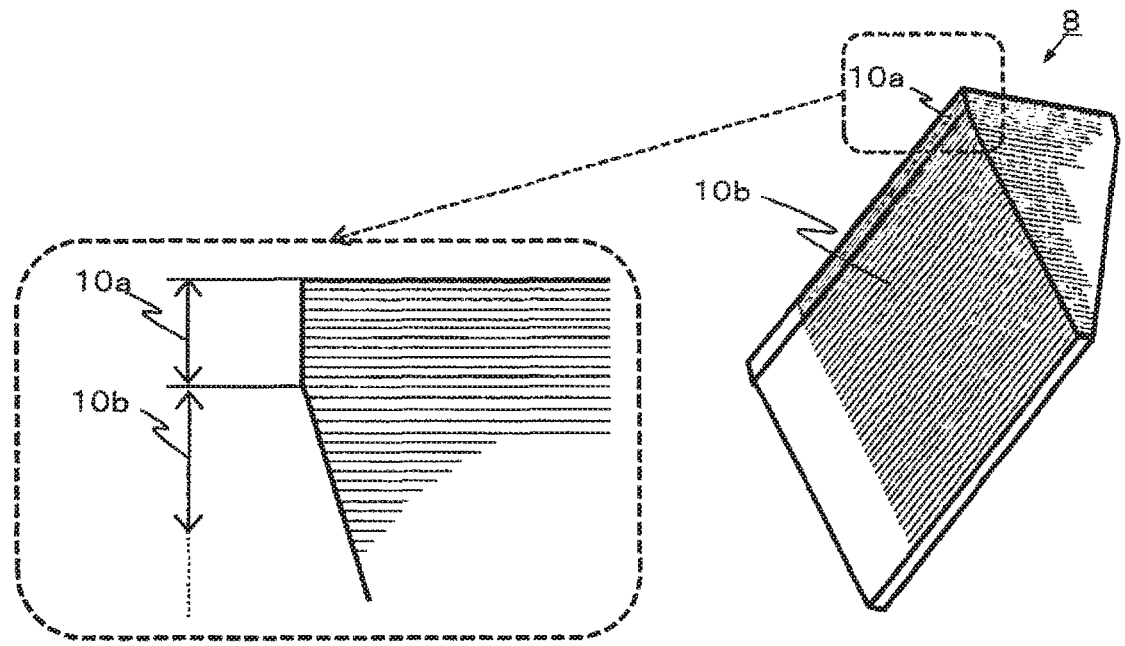
FIG. 3 are a perspective view schematically showing a laminated iron core of the first embodiment, and a partially enlarged view of the laminated iron core.
Figure 4:
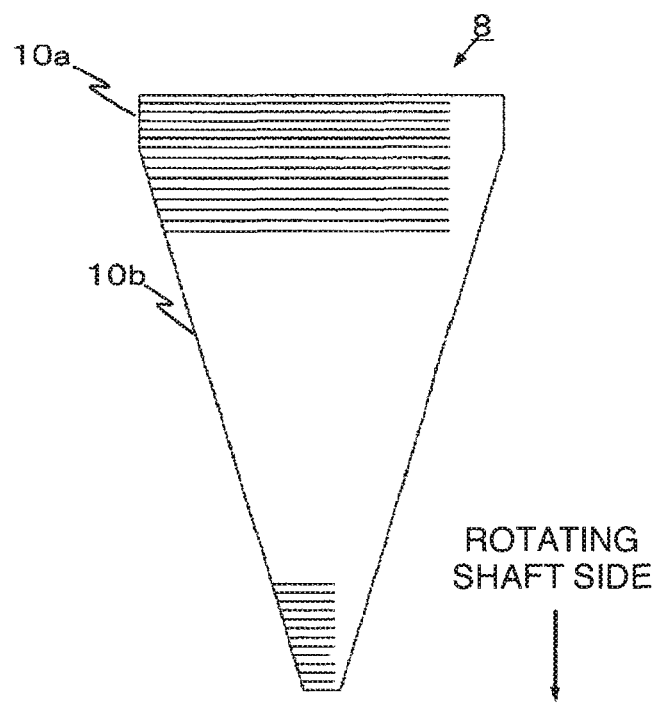
FIG. 4 is an end portion cross sectional view of the laminated iron core of the first embodiment.

FIG. 3 shows a configuration of the laminated iron core 8. On the side of the housing 5 of the laminated iron core 8, at least two or more core members 10a, whose widths are substantially the same in the rotation direction of the rotating shaft 4, are continuously laminated. On the side of the rotating shaft of the laminated iron core 8, at least two or more core members 10b, whose widths in the rotation direction of the rotating shaft 4 are gradually increased from the rotating shaft in the direction toward the housing 5 (in the radial direction of the rotating shaft), are continuously laminated. As shown in FIG. 4, the cross section of the laminated iron core 8 has a substantially home-base shape formed by the trapezoidal portion of the core members 10b, and the rectangular portion of the core members 10a.

The laminated iron core 8 needs to be inserted and arranged in the bobbin 7 with high accuracy, and hence, the outer diameter of the laminated iron core needs to be substantially equal to the inner diameter of the bobbin 7 (or slightly smaller than the inner diameter of the bobbin 7). However, the lamination thickness of the laminated iron core 8 may not be uniform. For example, there may be a case where the plate thickness dimension of the core member formed by cutting a plate (including a tape) is not uniform, or there may be a case where it is difficult to completely eliminate minute warping, and the like, of the cut surface. That is, there is a case where, even when a specified number of the core members are laminated, the lamination thickness does not become fixed, and hence, it is necessary to adjust the lamination thickness.

In the present embodiment, as shown in FIG. 3 and FIG. 4, the straight line portion (core members 10a), for increasing or decreasing a predetermined number of the laminated layers in correspondence with the variation of the plate thickness dimension of the core members 10b mainly laminated in the oblique side portion of the laminated core shape forming a substantially trapezoidal shape, is formed on the outer peripheral side with respect to the rotating shaft 4, that is, on the side to which the cutting width of the laminated core is increased.

According to the present embodiment, the lamination thickness of the laminated iron core 8 can be easily adjusted by increasing or decreasing the laminated layer number of the core members 10a. Thereby, in the axial air gap type electric motor, a stator with high precision can be obtained, and thereby, it is possible to maintain the performance of the electric motor.

[Second Embodiment]

Figure 5:
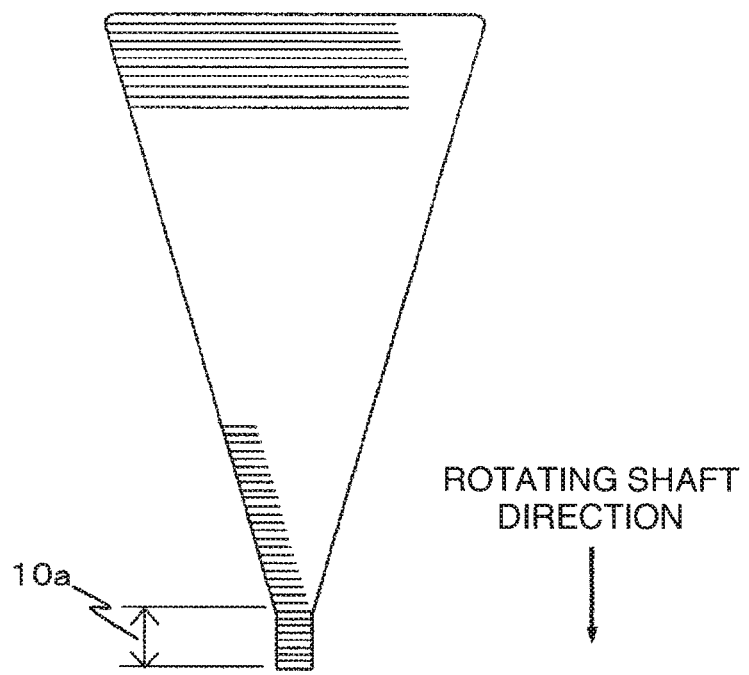
FIG. 5 is an end portion cross sectional view of a laminated iron core of an axial air gap type electric motor of a second embodiment.

Next, a second embodiment is described. FIG. 5 shows the cross section of the end portion of the laminated iron core 8 of the second embodiment. In the present embodiment, a straight line portion (core members 10a), for increasing or decreasing a predetermined laminated layer number of the plate-like core members 10a laminated in straight line shape corresponding to the cutting and lamination direction of the core members 10a, is formed on the inner peripheral side with respect to the rotating shaft 4 of the axial air gap type electric motor 1, that is, on the side on which the cutting width of the laminated iron core 8 is reduced (the side of the rotating shaft).

Even in this configuration, it is possible to easily adjust the lamination thickness of the laminated iron core 8 by increasing or decreasing the laminated layer number of the core members 10a. Thereby, in the axial air gap type electric motor, a stator with high precision can be obtained, and thereby, it is possible to maintain the performance of the electric motor.

Figure 6:
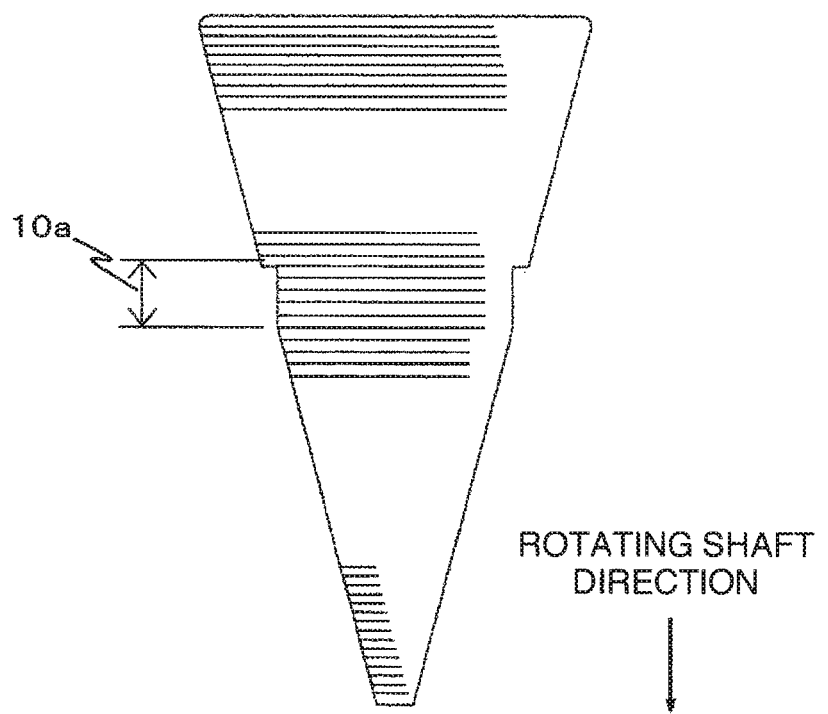
FIG. 6 is an end portion cross sectional view of a laminated iron core of an axial air gap type electric motor of a third embodiment.

Next, a third embodiment will be described. FIG. 6 shows the cross section of the end portion of the laminated iron core 8 of the third embodiment. In the present embodiment, a straight line portion (core members 10a), for increasing or decreasing a predetermined laminated layer number of the core members 10a, is formed in the vicinity of the center in the direction perpendicular to the rotating shaft 4 of the axial air gap type electric motor 1, that is, in the vicinity of the lamination direction center of the laminated iron core 8.

Even in this configuration, it is possible to easily adjust the lamination thickness of the laminated iron core 8 by increasing or decreasing the laminated layer number of the core members 10a. Thereby, in the axial air gap type electric motor, a stator with high precision can be obtained, and thereby, it is possible to maintain the performance of the motor.

APPLICATION EXAMPLES

Finally, application examples in which the first to third embodiments are combined are described. FIG. 7(a) to FIG. 7(d) each show the cross section of the end portion in an application example of the laminated iron core 8. In each of FIG. 7(a) to FIG. 7(d), each of portions indicated by dotted line circles shows the straight line portion (core members 10a) for adjusting the lamination thickness.

Figure 7A:
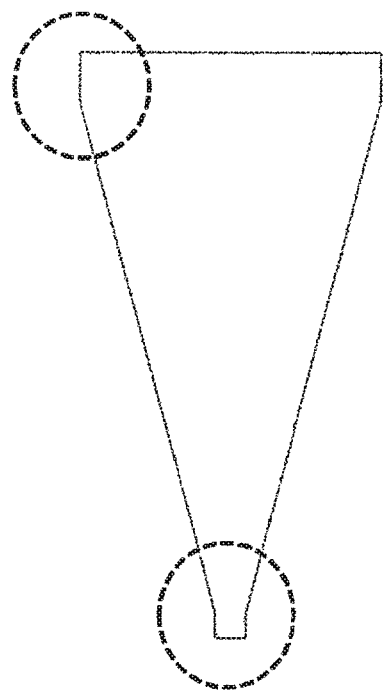
FIGS. 7A to 7D are end-portion cross-sectional views each schematically showing an application example in which main portions of the laminated iron cores of the first to third embodiments are combined.

FIG. 7(a) shows a configuration in which the core members 10a laminated in straight line are provided at the end portion on the outer peripheral side with respect to the rotating shaft 4 of the axial air gap type electric motor 1, that is, the side on which the cutting width of the core member is large, and also at the end portion of the inner periphery side with respect to the rotating shaft 4, that is, the side on which the cutting width of the core member is small.

Figure 7B:
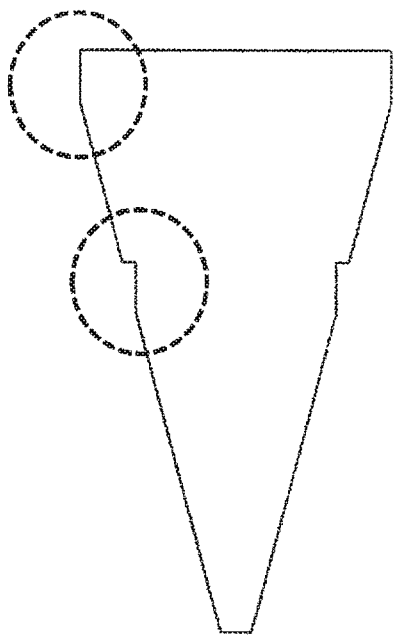

Similarly, FIG. 7(b) shows a configuration in which the core members 10a laminated in straight line are provided on the outer peripheral side with respect to the rotating shaft 4 of the axial air gap type electric motor 1, that is, the side on which the cutting width of the core member is large, and also in the vicinity of the center in the direction perpendicular to the rotating shaft 4, that is, in the vicinity of the center of the oblique side portion of the laminated iron core 8.

Figure 7C:
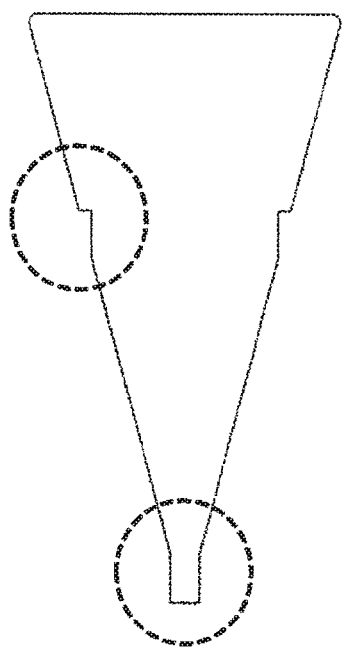

Similarly, FIG. 7(c) shows a configuration in which the core members 10a laminated in straight line are provided in the vicinity of the center in the direction perpendicular to the rotating shaft 4 of the axial air gap type electric motor 1, that is, in the vicinity of the center of the oblique side portion of the laminated iron core 8, and also on the inner peripheral side with respect to the rotating shaft 4, that is, the side on which the cutting width of the core member is small.

Figure 7D:
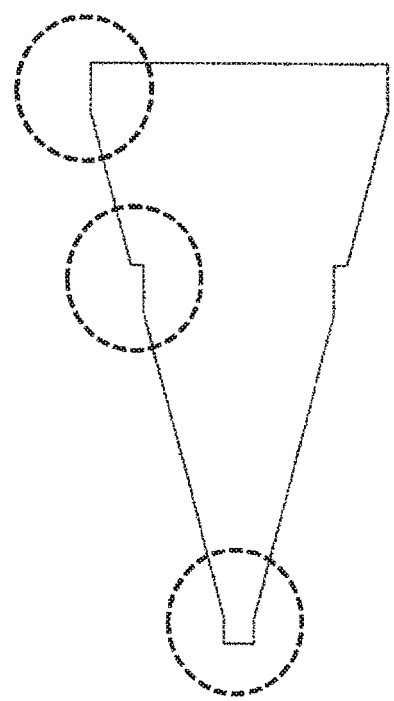

Further, FIG. 7(d) shows a configuration in which all of the first to third embodiments are provided at the same time. It should be noted that in FIG. 7(a) to FIG. 7(d), the thickness in the laminating direction of each straight portion (core members 10a) may not necessarily be the same. For example, in the case where the lamination thickness required for the straight portion is set to N, when the straight portion is provided at two places, the lamination thickness of each of the straight portions provided at the two places may be ½N, or the lamination thicknesses of the straight portions at the two places may be changed to have different ratios.

According to the application examples, since the arrangement place of the core members 10a laminated in the straight line is distributed in a plurality of places, the number of the core members 10a, which is increased or decreased at each of the adjustment places, can be reduced, and further, the overall shape of the laminated iron core 8 can also be made uniform by the adjustment. That is, the length of the straight portion cab be reduced, and thereby, the shape of the laminated core, which is more approximate to the trapezoidal shape, is maintained, so that the position, at when the bobbin 7 is inserted and arranged, can be stabilized.

In the above, the embodiments according to the present invention are described, but the present invention is not limited to the above-described embodiments, and various modifications are possible within the scope and spirit of the present invention. For example, the laminated core members 10a and 10b may not necessarily have a (horizontal) straight line, and may have an arc shape in the rotational direction of the rotating shaft (the cross section of the end portion of the laminated iron core 8 may be a fan-shape, or the like).

REFERENCE SIGNS LIST

1 . . . Axial air gap type electric motor
2 . . . Stator
3 . . . Rotor
4 . . . Rotating shaft
5 . . . Housing
6 . . . Stator core
7 . . . Bobbin
7a . . . Tubular section
7b . . . Flange
7c . . . Lead-out port
8 . . . Laminated iron core
9 . . . Coil
10a, 10b . . . Core member

The invention claimed is:

1. An axial air gap type electric motor comprising:
   a stator formed by arranging, in a ring shape about a rotating shaft, stator cores each configured by a laminated core, as a prismatic body, made up of laminating metal plate-like members in a radial direction of the rotating shaft, a tubular bobbin having an inner diameter into which the laminated core is inserted, and a coil wound on an extension of an outer diameter of the laminated core; and
   at least one rotor plane-facing the cross section of a rotating-shaft direction end portion of the stator via a predetermined air gap, wherein the laminated core includes:
a first portion formed by continuously laminating the metal plate-like members whose widths in the rotation direction of the rotating shaft are gradually increased from the rotating shaft center in the radial direction; and
a second portion formed by continuously laminating the metal plate-like members whose widths in the rotation direction of the rotating shaft are substantially equal;
wherein the second portion is located on an outermost side in the radial direction of the rotating shaft, and has a largest width in the rotation direction of the rotating shaft among all of the metal plate-like members.

2. The axial air gap type electric motor according to claim 1, wherein the laminated core further includes:
a third portion formed by continuously laminating the metal plate-like members whose widths in the rotation direction of the rotating shaft are substantially equal and minimum among all of the metal plate-like members constituting the laminated core,
wherein the third portion is located on a closest side to the rotating shaft in the radial direction of the rotating shaft.

3. The axial air gap type electric motor according to claim 1, wherein the laminated core further includes:
a fourth portion formed by continuously laminating the metal plate-like members whose widths in the rotation direction of the rotating shaft are substantially equal and larger than a minimum width but smaller than a largest width in the widths of the rotation direction among all of the metal plate-like members constituting the laminated core,
wherein the fourth portion is located on a position other than the outermost side and the closest side to the rotating shaft in the radial direction of the rotating shaft.

* * * * *